United States Patent [19]
Fukuda et al.

[11] Patent Number: 6,127,504
[45] Date of Patent: Oct. 3, 2000

[54] CURABLE COMPOSITIONS AND CURED GEL PARTS THEREOF

[75] Inventors: Kenichi Fukuda; Yasuo Tarumi, both of Gunma-ken, Japan

[73] Assignee: Shin-Etsu Chemical Co., Ltd., Tokyo, Japan

[21] Appl. No.: 09/219,866

[22] Filed: Dec. 24, 1998

[30] Foreign Application Priority Data

Dec. 24, 1997 [JP] Japan ................................. 9-366499

[51] Int. Cl.$^7$ ............................. C08G 77/08; C08G 77/24
[52] U.S. Cl. ........................... 528/15; 525/478; 525/479; 528/28; 528/31; 528/32; 528/34; 528/42; 528/43
[58] Field of Search .................... 528/15, 28, 31, 528/32, 34, 42, 43; 525/478, 479

[56] References Cited

U.S. PATENT DOCUMENTS

| | | |
|---|---|---|
| 4,771,119 | 9/1988 | Wrobel . |
| 5,656,711 | 8/1997 | Fukuda et al. ............................ 528/15 |
| 5,837,774 | 11/1998 | Tarumi et al. .......................... 525/104 |

FOREIGN PATENT DOCUMENTS

| | | |
|---|---|---|
| 0488709 | 6/1992 | European Pat. Off. . |
| 0765916 | 4/1997 | European Pat. Off. . |
| 0811651 | 12/1997 | European Pat. Off. . |
| 56-143241 | 11/1981 | Japan . |
| 62-3959 | 1/1987 | Japan . |
| 63-33475 | 2/1988 | Japan . |
| 63-35655 | 2/1988 | Japan . |

*Primary Examiner*—Robert Dawson
*Assistant Examiner*—Jeffrey B. Robertson
*Attorney, Agent, or Firm*—Birch, Stewart, Kolasch & Birch, LLP

[57] ABSTRACT

A linear polyfluoro compound having at least two alkenyl groups as a base component is blended with a linear polyfluoro compound having one alkenyl group and a hydrosilyl-bearing linear polysiloxane having fluoroalkyl substituents in side chains and at ends thereof. With a platinum catalyst added, there is obtained a curable composition having improved storage stability which will quickly cure into satisfactory gel products.

2 Claims, 1 Drawing Sheet

CURABLE COMPOSITIONS AND CURED GEL PARTS THEREOF

BACKGROUND OF THE INVENTION

Cured gel parts of silicone rubber have good electrical and thermal insulation, stable electrical properties, and softness. They find use as potting and sealing agents for electric and electronic parts and as coating materials on control circuit elements such as power transistors, IC's and capacitors for protecting the elements from external thermal and mechanical disturbances.

Typical of the silicone rubber compositions forming such cured gel parts are organopolysiloxane compositions of the addition curing type. For example, JP-A 143241/1981, 3959/1987, 35655/1988 and 33475/1988 corresponding to U.S. Pat. No. 4,771,119 disclose compositions comprising an organopoly-siloxane having a vinyl group attached to a silicon atom and an organohydrogenpolysiloxane having a hydrogen atom attached to a silicon atom wherein the compositions undergo crosslinking reaction in the presence of platinum catalysts to form silicone gel.

The silicone gel products resulting from these organopolysiloxane compositions, however, are susceptible to such chemicals as strong bases and strong acids and such solvents as toluene, alcohol and gasoline and cannot sustain their performance on account of swelling or degradation.

To solve this problem, a fluorochemical gel composition comprising a polyfluoro compound based on a divalent perfluoroalkylene or perfluorooxyalkylene group and having two alkenyl groups in a molecule as a base component, an organohydrogenpolysiloxane having a hydrogen atom attached to a silicon atom, and a platinum group catalyst was proposed as well as a cured fluorochemical gel part obtained by curing the composition. This fluorochemical gel shows improved chemical resistance and solvent resistance over silicone gel as intended. However, the composition lacks long-term storage stability or is short in the steady curing of quickly reaching the desired penetration.

Therefore, an object of the invention is to provide a fluorochemical curable composition having improved storage stability and sufficient curability to ensure that it quickly cures to a cured gel product having the desired penetration. Another object of the invention is to provide a cured gel product obtained by curing the fluorochemical curable composition.

SUMMARY OF THE INVENTION

We have found that by using a linear polyfluoro compound having at least two alkenyl groups as a base component, and combining it with a linear polyfluoro compound having one alkenyl group and a hydrosilyl-bearing linear polysiloxane having fluoroalkyl substituents in side chains and at ends thereof, there is obtained a curable composition having improved storage stability and improved curability or curing stability which will cure into satisfactory gel parts.

Specifically, the present invention provides a fluorochemical curable composition comprising as main components, (A) a linear polyfluoro compound of the following general formula (1), (B) a linear polyfluoro compound of the following general formula (2), (C) a hydrosilyl-bearing organic silicon compound of the following general formula (3), and (D) a catalytic amount of a platinum group catalyst.

The invention also provides a cured gel part obtained by curing the composition and having a penetration of 1 to 200 according to ASTM D-1403.

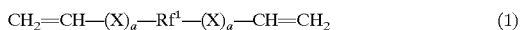

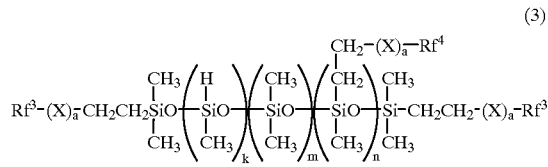

In the formulas, X is independently —$CH_2$—, —$CH_2O$—, —$CH_2OCH_2$— or —Y—$NR^1$—CO—;

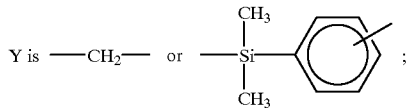

$R^1$ is hydrogen or substituted or unsubstituted monovalent hydrocarbon group;

$Rf^1$ is a divalent perfluoroalkylene or perfluorooxyalkylene group; $Rf^2$ is a monovalent perfluoroalkyl or perfluorooxyalkyl group; $Rf^3$ and $Rf^4$ are independently as defined for $Rf^2$;

letter a is independently equal to 0 or 1, k is an integer of at least 2, m is an integer of at least 1, and n is an integer of at least 1.

BRIEF DESCRIPTION OF THE DRAWINGS

The only figure.

DETAILED DESCRIPTION OF THE INVENTION

Figure 1:
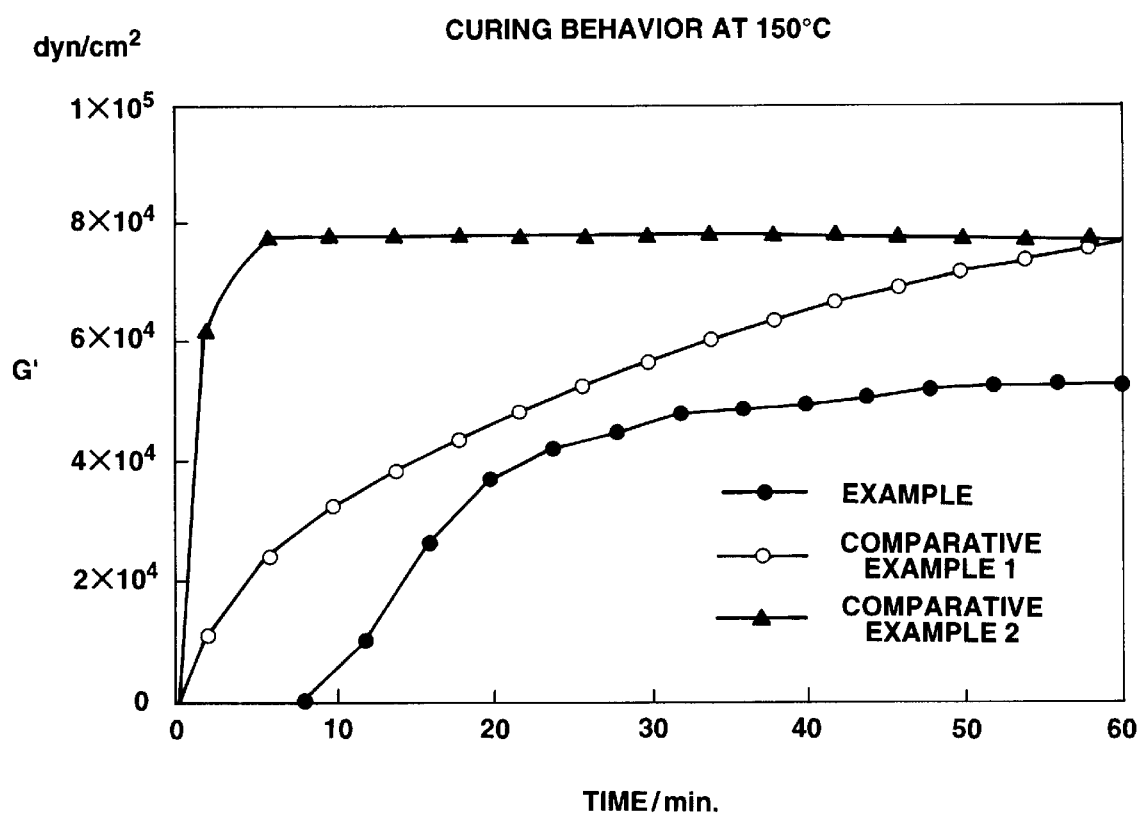
FIG. 1 is a graph showing the curing behavior at 150° C. of the curable compositions of Example 1 and Comparative Examples 1 and 2.

Component (A) of the curable composition according to the invention is a linear polyfluoro compound of the following general formula (1).

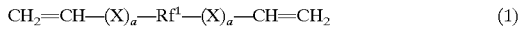

In formula (1), $Rf^1$ is a divalent perfluoroalkylene or divalent perfluorooxyalkylene group. Preferred divalent perfluoroalkylene groups are represented by

wherein m is an integer of 1 to 10, preferably 2 to 6. Preferred divalent perfluorooxyalkylene (or perfluoropolyether) groups are represented by the following formulas:

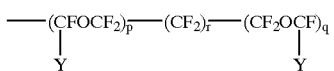

wherein Y is fluorine or a $CF_3$ group, letters p, q and r are integers in the ranges: $p \geq 1$, $q \geq 1$, $2 \leq p+q \leq 200$, and $0 \leq r \leq 6$, and especially $2 \leq p+q \leq 110$, $$-CF_2CF_2OCF_2-(CFOCF_2)_s-(CF_2)_r-(CF_2OCF)_t-CF_2OCF_2CF_2-$$
$$\phantom{-CF_2CF_2OCF_2-(}\underset{\displaystyle CF_3}{|}\phantom{)_s-(CF_2)_r-(}\underset{\displaystyle CF_3}{|}$$

wherein r, s, and t are integers in the ranges: $0 \leq r \leq 6$, $s \geq 0$, $t \geq 0$, and $0 \leq s+t \leq 200$, and especially $2 \leq s+t \leq 110$;

$$-CF-(OCFCF_2)_u-(OCF_2)_v-OCF-$$
$$\phantom{-}\underset{Y}{|}\phantom{-(O}\underset{Y}{|}\phantom{CF_2)_u-(OCF_2)_v-O}\underset{Y}{|}$$

wherein Y is fluorine or a $CF_3$ group, and u and v are integers in the ranges: $1 \leq u \leq 100$ and $1 \leq v \leq 50$; and $$-CF_2CF_2-(OCF_2CF_2CF_2)_w-OCF_2CF_2-$$

wherein w is an integer in the range: $1 \leq w \leq 100$.

Illustrative examples of $Rf^1$ include the following groups:

$$-C_4F_8-, \quad -C_5F_{12}-,$$

$$-(CFOCF_2)_n(CF_2OCF)_{\overline{m}}-$$
$$\phantom{-(}\underset{CF_3}{|}\phantom{OCF_2)_n(}\underset{CF_3}{|}$$

$\overline{n+m} = 2 \sim 200$, $\quad -CF_2CF_2OCF_2(CF_2)_2CF_2OCF_2CF_2-,$ $$-CF_2CF_2OCF_2CFOCF_2(CF_2)_2CF_2OCFCF_2OCF_2CF_2-,$$
$$\phantom{-CF_2CF_2OCF_2}\underset{CF_3}{|}\phantom{OCF_2(CF_2)_2CF_2O}\underset{CF_3}{|}$$

$$-CF_2(OCF_2CF_2)_n(OCF_2)_mOCF_2-$$

$\overline{n} = 1 \sim 100, \quad \overline{m} = 1 \sim 100,$ $$-CF(OCFCF_2)_n(OCF_2)_mOCF- \quad \overline{n} = 1 \sim 100,$$
$$\phantom{-}\underset{CF_3}{|}\underset{CF_3}{|}\phantom{OCF_2)_n(OCF_2)_m}\underset{CF_3}{|}$$

$\overline{m} = 1 \sim 100, \quad -CF_2CF_2(OCF_2CF_2CF_2)_nOCF_2CF_2-$ $\overline{n} = 5 \sim 100$ In formula (1), X is independently $-CH_2-$, $-CH_2O-$, $-CH_2OCH_2-$ or $-Y-NR^1-CO-$. Herein, Y is $-CH_2-$ or a group represented by $$-\underset{\displaystyle \underset{CH_3}{|}}{\overset{\displaystyle \overset{CH_3}{|}}{Si}}-\!\!\bigcirc\!\!\diagup\;;$$

$R^1$ is hydrogen or substituted or unsubstituted monovalent hydrocarbon group. Preferred monovalent hydrocarbon groups are those having 1 to 12 carbons, and more preferably 1 to 10 carbons, for example, alkyl groups such as methyl, ethyl, propyl, butyl, hexyl, cyclohexyl, and octyl; aryl groups such as phenyl and tolyl; and aralkyl groups such as benzyl and phenylethyl. Also included are substituted hydrocarbon groups in which some or all of the hydrogen atoms of the foregoing groups are replaced with halogen atoms such as fluorine.

The alkenyl groups that formula (1) possesses are preferably those groups having a $-CH=CH_2$ structure at an end, for example, vinyl and allyl groups. The alkenyl groups may be attached to the backbone at both ends directly or via a divalent linking group represented by X.

In formula (1), letter a is independently equal to 0 or 1.

Component (B) of the composition according to the invention is a linear polyfluoro compound of the following general formula (2).

$$Rf^2-(X)_a-CH=CH_2 \qquad (2)$$

Herein $Rf^2$ is a monovalent perfluoroalkyl group or a monovalent perfluorooxyalkyl (or perfluoropolyether) group. Preferred monovalent perfluoroalkyl groups are represented by $$C_mF_{2m+1}-$$

wherein m is an integer from 1 to 20, and preferably from 2 to 10. Preferred illustrative examples of monovalent perfluorooxyalkyl groups are given below.

$$F-(CFCF_2O)_{\overline{p}}-CF-$$
$$\phantom{F-(}\underset{CF_3}{|}\phantom{CF_2O)_{\overline{p}}-}\underset{CF_3}{|}$$

p is an integer of at least 1.

$$F-(CFCF_2O)_Q-CFCF_2OCF_2CF_2-$$
$$\phantom{F-(}\underset{CF_3}{|}\phantom{CF_2O)_Q-}\underset{CF_3}{|}$$

q is an integer of at least 1.

Illustrative examples of $Rf^2$ are given below.

$C_4F_9-, \quad C_8F_{17}-$ $$F-(CFCF_2O)_{\overline{n}}-CF-$$
$$\phantom{F-(}\underset{CF_3}{|}\phantom{CF_2O)_{\overline{n}}-}\underset{CF_3}{|}$$

n = 2–200

$$F-(CFCF_2O)_{\overline{n}}-CFCF_2OCF_2CF_2-$$
$$\phantom{F-(}\underset{CF_3}{|}\phantom{CF_2O)_{\overline{n}}-}\underset{CF_3}{|}$$

n = 2–200

In formula (2), X and "a" are as defined in formula (1). It is understood that X and "a" in formula (1) may be identical with or different from X and "a" in formula (2).

As in formula (1), the alkenyl groups that formula (2) possesses are preferably those groups having a $-CH=CH_2$ structure at an end, for example, vinyl and allyl groups. The alkenyl groups may be attached to the backbone directly or via a divalent linking group represented by X.

In order that the composition of the invention be used in casting, potting, coating, impregnation, adhesion or bonding, the composition should preferably have appropriate fluidity and appropriate physical properties when cured. It is desirable from this point of view that components (A) and (B) have a viscosity of about 5 to about 100,000 centipoise (cp) at 25° C. By selecting components (A) and (B), the composition is adjusted to the most appropriate viscosity within this range for a particular application.

Component (C) of the composition according to the invention is a hydrosilyl-bearing organic silicon compound of the following general formula (3).

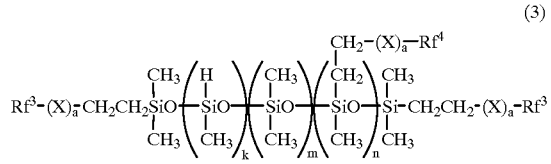

(3)

Herein, X and "a" are as defined above. More particularly, a plurality of X's and a plurality of "a's" in formula (3) may be identical or different from each other, and may also be identical with or different from X's and "a's" in formulas (1) and (2). $Rf^3$ and $Rf^4$ are independently as defined for $Rf^2$. $Rf^3$ may be identical with or different from $Rf^4$.

In formula (3), letter k is an integer of at least 2, preferably 2 to 20; m is an integer of at least 1, preferably 1 to 40; and n is an integer of at least 1, preferably 1 to 20.

Illustrative examples of the fluorinated organosiloxane are given below wherein Me is methyl and Ph is phenyl. These compounds may be used alone or in admixture.

the desired penetration, which are attributable to the structure of the hydrosilyl-bearing linear organosilicon compound having fluoroalkyl groups substituted in side chains and at ends as component (C).

First, the substitution of fluoroalkyl groups in side chains and at ends is effective for increasing the fluorine content in the molecule, thereby improving the compatibility with components (A) and (B). Advantages derived from the improved compatibility are that the composition can be kept stable without separation, and constant reaction proceeds during curing, resulting in a gel-like composition of quality.

Secondly, since hydrosilyl groups are positioned solely in side chains of the linear polysiloxane molecule, addition reaction for curing is moderate and a composition obtained by mixing components (A) to (D) can be kept stable. In particular, when a control agent for the hydrosilylation catalyst to be described later is blended in the composition, long-term storage stability is ensured. In contrast, a polysiloxane containing a hydrosilyl group at an end of the molecule as shown by $—OSi(CH_3)_2H$ has too high addition reactivity, allowing a composition obtained by mixing com-

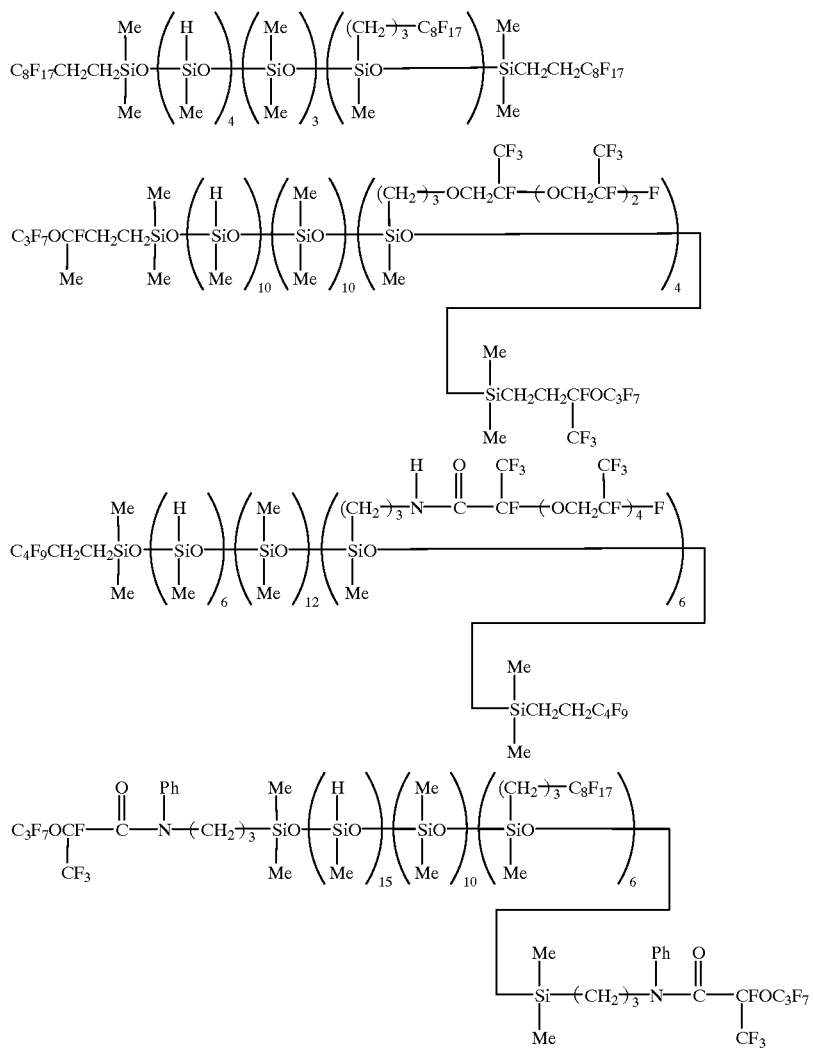

The invention endows the composition with the long-term storage stability and the steady curing of quickly reaching ponents (A) to (D) to cure sooner or later to a gel state even when a control agent is admixed. In this case, it is unavoidable to formulate the composition in two-part form, for example, by blending components (A), (B) and (D) as one part, and separately blending components (A), (B) and (C) as another part so that two parts are mixed on use. In this regard, the invention permits all the components to be formulated as a one-part composition, avoiding a cumbersome step of mixing before use.

Thirdly, hydrosilyl-bearing siloxane units —OSi(CH$_3$)H— are randomly distributed in the molecule along with dimethylsiloxane units —OSi(CH$_3$)$_2$— and fluoroalkyl-substituted siloxane units, which is a further advantage. The random distribution allows the consumption of hydrosilyl groups during curing reaction to proceed smoothly, ensuring the steady curing of quickly reaching the desired penetration. In contrast, a linear polysiloxane of the structure in which only hydrosilyl-bearing siloxane units —OSi(CH$_3$)H— are continuously repeated tends to prevent the reaction of all hydrosilyl groups from proceeding to completion, resulting in unsteady curing.

Preferably, component (C) is blended in such amounts as to provide 0.2 to 2.0 mol, more preferably 0.5 to 1.3 mol of hydrosilyl groups, that is, SiH groups, in component (C) per mol of the aliphatic unsaturated groups including vinyl, allyl and cycloalkenyl groups in the entire composition. Outside the range, less amounts of SiH groups would provide an insufficient degree of crosslinking and fail to cure into gel whereas excessive amounts of SiH groups can invite the risk of expansion during curing.

Component (D) of the composition according to the invention is a platinum group catalyst which promotes addition reaction between alkenyl groups in components (A) and (B) and hydrosilyl groups in component (C). The platinum group catalysts are generally noble metal compounds which are expensive, and relatively easily available platinum compounds are often used.

Illustrative examples of the platinum compound include chloroplatinic acid, complexes of chloroplatinic acid with olefins such as ethylene, complexes of chloroplatinic acid with alcohols or vinylsiloxanes, and platinum on silica, alumina or carbon. The platinum compound is not restricted to these examples. Known platinum group compounds other than the platinum compounds include compounds of rhodium, ruthenium, iridium and palladium, for example, RhCl(PPh$_3$)$_3$, PhCl(CO)(PPh$_3$)$_2$, Ru$_3$(CO)$_{12}$, IrCl(CO)(PPh$_3$)$_2$, and Pd(PPh$_3$)$_4$. The catalyst is usually employed in an amount of 0.1 to 100 ppm based on the total weight of components (A), (B) and (C).

In the composition of the invention comprising components (A) to (D) mentioned above, a variety of per se known additives may be added. Such additives include control agents for hydrosilylation catalysts, for example, acetylene alcohols such as 1-ethynyl-1-hydroxycyclohexane, 3-methyl-1-butyn-3-ol, 3,5-dimethyl-1-hexyn-3-ol, 3-methyl-1-pentyn-3-ol, and phenyl butynol; 3-methyl-3-penten-1-yne, 3,5-dimethyl-3-hexen-1-yne, polymethylvinylsiloxane cyclic compounds, and organic phosphorus compounds. These control agents are effective for maintaining adequate curing reactivity and storage stability. Further, the cured gel resulting from the composition of the invention can be adjusted in hardness and mechanical strength by adding thereto inorganic fillers such as fumed silica, silica aerosil, precipitated silica, ground silica, diatomaceous earth, iron oxide, zinc oxide, titanium oxide, calcium carbonate, magnesium carbonate, zinc carbonate, and carbon black. Of course, hollow inorganic fillers, hollow organic fillers and spherical rubbery fillers may also be added. The amounts of these additives blended are arbitrary as long as the physical properties of cured gel are not adversely affected.

The composition of the invention comprising the essential components (A) to (D) and optional components as described above can be cured into a gel product having improved resistance to solvents and chemicals.

The term (cured) gel product indicates a state having in part a three-dimensional structure and exhibiting deformation and fluidity under applied stresses. As a general measure, the gel product should have a hardness of "0" or lower as measured by a JIS rubber hardness meter and a penetration of a loaded needle of 1 to 200 according to ASTM D-1403 (¼ cone).

Conventional well-known methods may be used in forming a cured gel product from the composition of the addition curing type according to the invention. For example, the composition is introduced into a suitable mold where the composition is cured. Alternatively, the composition is applied onto a suitable substrate and then cured. Curing is readily effected by heating at a temperature of about 60° C. to about 150° C. for about 30 to about 180 minutes.

There has been described a curable composition which remains well stable during storage and is effectively curable. The resulting cured gel product has improved properties.

EXAMPLE

Examples of the invention are given below by way of limitation and not by way of limitation. All parts are by weight. Viscosity is a measurement in centipoise (cp) at 25° C.

Example 1

To 50 parts of a polymer (viscosity 3,000 cp) of formula (4) shown below and 50 parts of a polymer (viscosity 1,000 cp) of formula (5) shown below were added 13.7 parts of a compound of formula (6) shown below, 0.15 part of a 50% toluene solution of ethynyl cyclohexanol, and 0.015 part of an ethanol solution of a chloroplatinic acid/vinylsiloxane complex (platinum concentration 3.0% by weight). By mixing the ingredients, a fluorochemical composition was prepared.

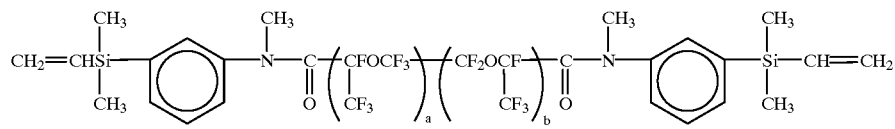

(4)

-continued

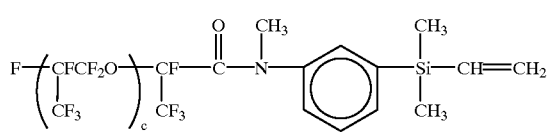

(5)

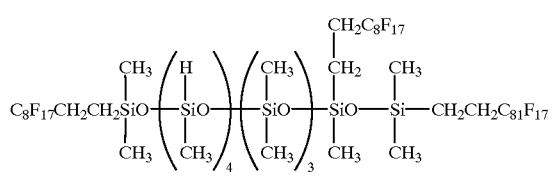

(6)

The composition was heated at 150° C. for one hour for curing into a clear gel product which showed a penetration of 78 as measured according to ASkMTI D-1403 (¼ cone).

Comparative Example 1

A composition was prepared as in Example 1 except that 8.7 parts of a compound of formula (7) shown below was used instead of the compound of formula (6).

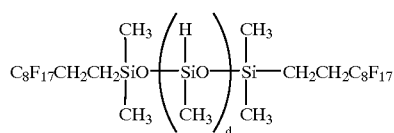

(7)

$d = 4$

The composition was similarly cured, obtaining a clear gel product having a penetration of 64.

Comparative Example 2

A composition was prepared as in Example 1 except that 12.1 parts of a compound of formula (8) shown below was used instead of the compound of formula (6).

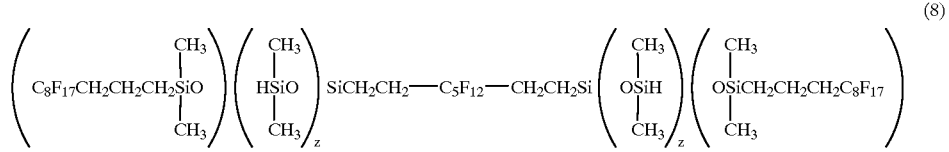

(8)

The composition was similarly cured, obtaining a clear gel product having a penetration of 65.

The above-prepared compositions were examined for storage stability and curability.

Storage stability

The compositions were stored in sealed containers at 40° C. for 30 days. The aged compositions were measured for viscosity, with the results shown in Table 1.

TABLE 1

|  | E1 | CE1 | CE2 |
|---|---|---|---|
| Initial (cp) | 1140 | 1290 | 1250 |
| Aged (cp) | 1140 | 1290 | gelled |

Curability

The compositions were heated at 150° C. for curing while they were measured for modulus of elasticity (G') at predetermined intervals. The results are shown in FIG. 1.

It is evident that the composition of Comparative Example 1 does not undergo quick curing to completion and lacks steady curing. The composition of Comparative Example 2 lacks long-term storage stability. The composition within the scope of the invention satisfies both of storage stability and quick curing.

Japanese Patent Application No. 366499/1997 is incorporated herein by reference.

Reasonable modifications and variations are possible from the foregoing disclosure without departing from either the spirit or scope of the present invention as defined by the claims.

We claim:

1. A fluorochemical curable composition comprising (A) a linear polyfluoro compound of the following general formula (1):

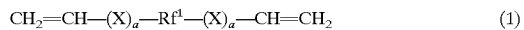

(1)

wherein X is independently —CH$_2$—, —CH$_2$O—, —CH$_2$OCH$_2$— or —Y—NR$^1$—CO—, Y is 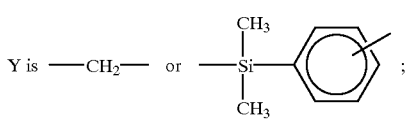 ;

$R^1$ is hydrogen or substituted or unsubstituted monovalent hydrocarbon group, $Rf^1$ is a divalent perfluoroalkylene or perfluorooxyalkylene group, and letter a is independently equal to 0 or 1, (B) a linear polyfluoro compound of the following general formula (2):

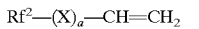 (2)

wherein X and "a" are as defined above, $Rf^2$ is a monovalent perfluoroalkyl or perfluorooxyalkyl group, (C) a hydrosilyl-bearing organic silicon compound of the following general formula (3):

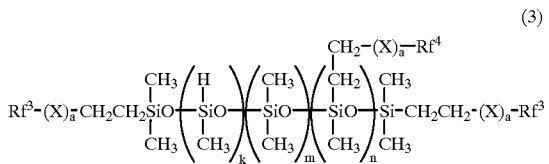 (3)

wherein X and "a" are as defined above, $Rf^3$ and $Rf^4$ are independently as defined for $Rf^2$, letter k is an integer of at least 2, m is an integer of at least 1, and n is an integer of at least 1, and (D) a catalytic amount of a platinum group catalyst.

2. A gel product obtained by curing the composition of claim 1 and having a penetration of 1 to 200 according to ASTM D-1403.

* * * * *